Figure 4:
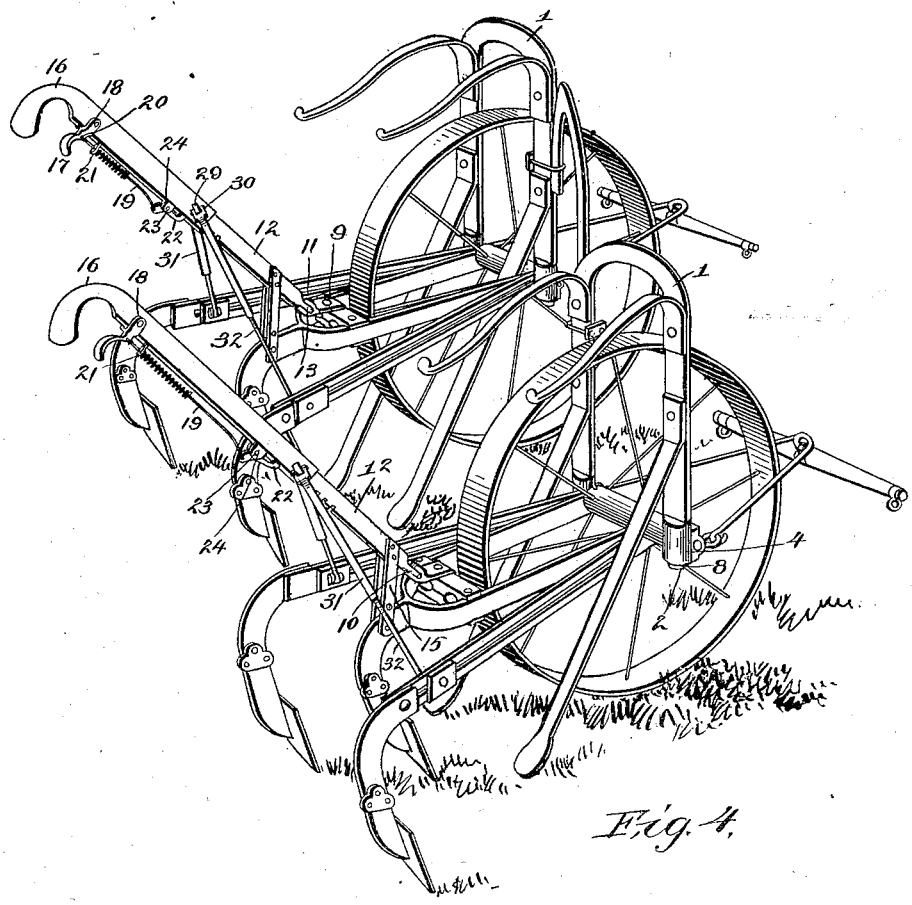

No. 725,159. PATENTED APR. 14, 1903.
E. S. SLOUGH.
WHEEL CULTIVATOR.
APPLICATION FILED NOV. 16, 1901.
NO MODEL. 2 SHEETS—SHEET 1.
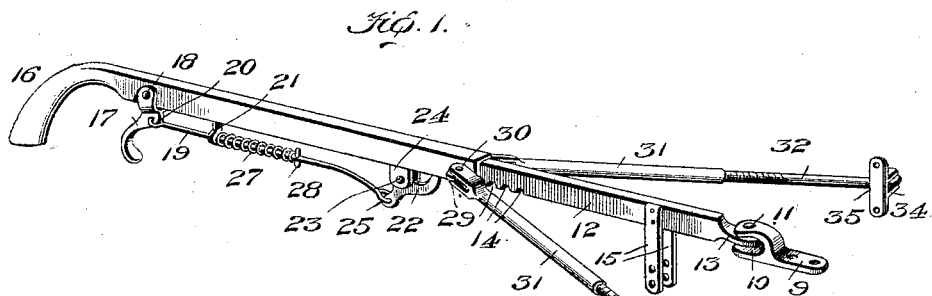
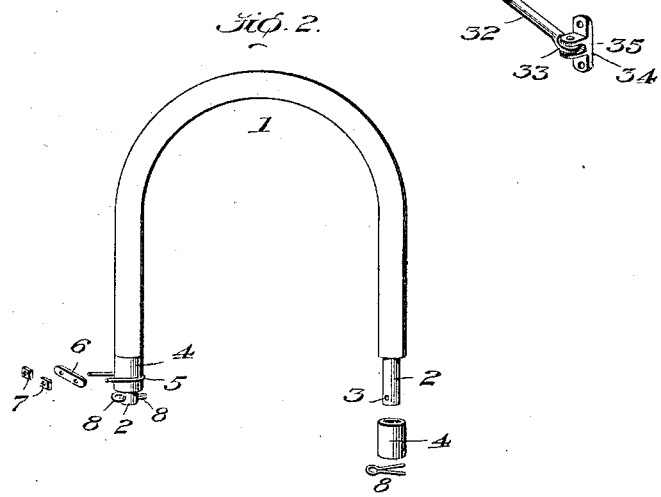
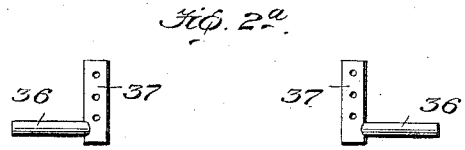
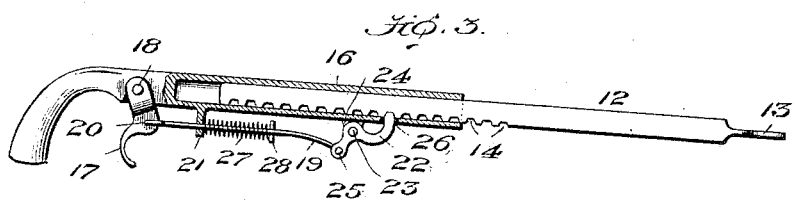
Witnesses
Everett S. Slough
Inventor
By P. L. Courtright
Attorney No. 725,159. PATENTED APR. 14, 1903.
E. S. SLOUGH.
WHEEL CULTIVATOR.
APPLICATION FILED NOV. 16, 1901.

NO MODEL. 2 SHEETS—SHEET 2.

Witnesses:
J. E. Courtright
A. Gottlieb

Inventor:
Everett S. Slough
By P. L. Courtright
Attorney

UNITED STATES PATENT OFFICE.

EVERETT S. SLOUGH, OF QUINCY, KANSAS.

WHEEL-CULTIVATOR.

SPECIFICATION forming part of Letters Patent No. 725,159, dated April 14, 1903.

Application filed November 16, 1901. Serial No. 82,522. (No model.)

*To all whom it may concern:*

Be it known that I, EVERETT S. SLOUGH, a resident of Quincy, in the county of Greenwood and State of Kansas, have invented a new and useful Improvement in Wheel-Cultivators, of which the following is a specification.

This invention relates to certain new and useful improvements in agricultural implements, more especially wheeled cultivators; and the present invention is designed, primarily, as an improvement upon the wheel-cultivator shown and described in the Patent No. 683,151, granted to me September 24, 1901.

It has for its objects, among others, to provide novel attachments whereby a number of cultivators may be united into one and provision is made for the adjustment of the cultivators so as to draw them nearer together or spread them farther apart to suit the width of rows.

The invention has for a further object to provide for such a novel form of attachments for this purpose that they may be readily and easily applied and quickly manipulated.

The cultivator shown and described in my former patent above referred to may be easily transformed into a multiple cultivator by the present improvement, as may any other cultivator.

Other objects and advantages of the invention will hereinafter appear, and the novel features thereof will be specifically defined by the appended claims.

The present invention is clearly illustrated in the accompanying drawings, which, with the numerals of reference marked thereon, form a part of this specification, and in which—

Figure 1 is a perspective view of the novel attachment for adjusting the outside cultivating-blades in accordance with the width of the rows. Fig. 2 shows in perspective the arch employed and the attaching means. Fig. 3 is a view partly in elevation and partly in section, showing the adjusting-handle and its pawl acting in conjunction with the rack-bar. Fig. 4 is a perspective view of the entire cultivator as formed by the combination of two of the one-wheel cultivators.

Like characters of reference indicate like parts in the different views.

Referring now to the details of the drawings, 1 designates an arch, which is designed to be attached by the sides of the arches B, one arch B being secured upon each side of the said arch 1, the lower ends of the legs of the arch 1 having reduced portions 2 with holes 3, the said reduced portions being designed to engage in sleeves or sockets 4, which are designed to be clamped to the lower portions of the arch B in any suitable manner, as by the clamp 5, which surrounds the sleeve, and the washer or plate 6 and the nuts 7, as seen clearly in Fig. 2. Cotter-pins 8 are employed, which pass through the openings 3 in the reduced portions 2 below the said sleeves, as seen at the left of Fig. 2.

9 is a clamping-plate, designed to be secured to the clamping-plates on the center beam of the cvltivator and having a bifurcated portion 10, receiving a vertical pivot 11, which pivotally holds therein the end of the bar 12, the pivot end 13 of which is flattened, as shown, and its under face provided with a series of notches 14. This bar is rectangular in form and may be braced by the braces 15, which are designed to be attached to the center beam of the cultivator.

16 is the handle, by which one man may manipulate the machine. It is formed with a rectangular hollow portion, within which the bar 12 is received and in which it is adjustable. 17 is a lever pivotally mounted, as at 18, on the said handle, and to this lever is attached one end of the rod 19, as at 20, which rod is guided through a lug or guide 21 on the under side of the handle, as seen clearly in Figs. 1 and 3, and its other end is pivotally attached to the pawl or dog 22, which is pivotally mounted at 23 on the ears or lugs 24, depending from the handle, as shown, the rod 19 being pivotally connected, as at 25, to the tail end of the said pawl or dog. The acting end of the pawl or dog works through an opening 26 in the under side of the hollow portion of the handle to engage the notches or teeth of the bar 12, as seen clearly in Fig. 3.

27 is a spring around the rod 19 between the lug 21 and a fixed stop 28 on the said rod.

29 represents lugs on opposite sides of the handle 16, and to these lugs are pivoted by the vertical pivots 30 the hollow rods 31, which are interiorly threaded and adapted to receive the screw-threaded rods 32, the other ends of which are pivotally mounted on vertical pivots 33, which are held in the bifurcations 34 of the plates 35, which latter are designed to be secured to the outside beams of the cultivator, to which the outside cultivator-blades are designed to be attached.

36 represents stub axles or spindles designed to be attached to the lower ends on either side of the arch 1, and on these spindles are designed to be mounted the sleeves and supporting-wheels of the cultivator. The stub-axles have the vertical portions 37, with openings or holes for the reception of their attaching devices, as 5, 6, and 7, designed to be used to attach the stub-axles to the sockets 4.

It will thus be seen that I have provided a novel form of attachment whereby a two or three part cultivator may be readily constructed and that by manipulation of the handle and the pawl or dog mounted thereon the cultivator-blades of the outer frames may be readily adjusted to bring them nearer to or farther from the center blades, according to the width between the rows. The attachments herein set forth may be made and placed on the market for attachment to the cultivator shown in my prior patent or any other forms of such devices.

Modifications in detail may be resorted to without departing from the spirit of the invention or sacrificing any of its advantages.

What is claimed as new is—

1. An attachment to wheel-cultivators, comprising an arch, sleeves to receive the lower ends thereof, means for holding the arch and sleeves together, and means for attaching the sleeves in position, as set forth.

2. The combination with the handle and the bar movable therein, of the pawl pivoted on the handle to engage said bar and a lever connected with the said pawl, as set forth.

3. The combination with the handle and the notched bar movable therein, of the rods pivoted to the handle and means for holding the bar in its adjusted position, as set forth.

4. The combination of the hollow handle, the notched bar movable therein, the pawl pivoted on the handle and engaging the notches of the bar, the rods pivoted to the handle and the arms adjustable in the rods, as set forth.

5. The combination with the hollow handle and the notched bar movable therein, of the pivoted pawl for engaging the said bar, the hollow screw-threaded rods pivoted to the handle, and the bars threaded into the said rods and pivotally mounted at their other ends, as and for the purpose specified.

6. The combination of the handle and the adjustable bar, of means for connecting the same with the supports of the cultivator-blades and adjusting the latter toward or from each other, as set forth.

7. The combination with the handle and the bar adjustable therein and pivoted at its other end, of the rods pivoted to opposite sides of the handle, the bars adjustable in the said rods, means for moving the main bar and plates pivotally connected to the ends of the side bars, all substantially as shown and described and for the purpose specified.

EVERETT S. SLOUGH.

Witnesses:
HARRY CLARK,
JOHN M. HARTONG.